United States Patent [19]

Johnson

[11] 4,222,197
[45] Sep. 16, 1980

[54] GARDEN CURBING AND METHOD OF FORMING SAME

[76] Inventor: George W. S. Johnson, 2926 Club House Rd., Costa Mesa, Calif. 92626

[21] Appl. No.: 947,469

[22] Filed: Oct. 2, 1978

[51] Int. Cl.³ .......................... A01G 1/00; E04B 1/16; E01C 11/22

[52] U.S. Cl. .......................................... 47/33; 52/102; 206/321; 229/22; 249/1; 264/31; 404/7; 405/287

[58] Field of Search .................. 47/32, 33, 58, 19, 23, 47/24, 25, 85, 86, 87; 405/287, 267; 404/2, 7, 8; 52/102, 169.1, 169.11, 169.12, 169.13; 264/31, 313, 333, 337; 249/1, 2, 10; 229/22; 220/62, DIG. 13; 206/321, 423, 551

[56] References Cited

U.S. PATENT DOCUMENTS

| | | | |
|---|---|---|---|
| 2,081,380 | 5/1937 | Nachreiner | 52/169.1 X |
| 2,662,342 | 12/1953 | Peterson | 47/33 |
| 2,913,161 | 11/1959 | Travis | 229/22 |
| 3,166,871 | 1/1965 | Simison | 264/31 X |
| 3,277,606 | 10/1966 | Cohen | 47/33 |
| 3,987,585 | 10/1976 | Greenbaum | 47/85 |
| 4,065,877 | 1/1978 | Kelley | 47/85 |
| 4,074,479 | 2/1978 | Krupka | 47/33 |

FOREIGN PATENT DOCUMENTS

| | | | |
|---|---|---|---|
| 59741 | 1/1968 | Fed. Rep. of Germany | 405/267 |
| 1459788 | 12/1968 | Fed. Rep. of Germany | 404/7 |

Primary Examiner—Edward M. Coven
Assistant Examiner—James R. Feyrer
Attorney, Agent, or Firm—William C. Babcock

[57] ABSTRACT

Disclosed herein is a method and apparatus for forming borders and the like around garden areas, the apparatus comprising cardboard sheets having scribed thereon three bending folds, each bending fold extending longitudinally along the surface of the cardboard sheet. More specifically a center fold bisects longitudinally elongate rectangular cardboard pieces, the center fold having formed laterally adjacent thereto two side folds. In use the cardboard piece is bent to form a V-section with the side folds being bent over to form vertical surfaces on either edge of the "V". These surfaces are then joined by various fastening devices and the cardboard structure is inserted into the ground and filled with cement or precast concrete blocks.

8 Claims, 8 Drawing Figures

U.S. Patent  Sep. 16, 1980  4,222,197
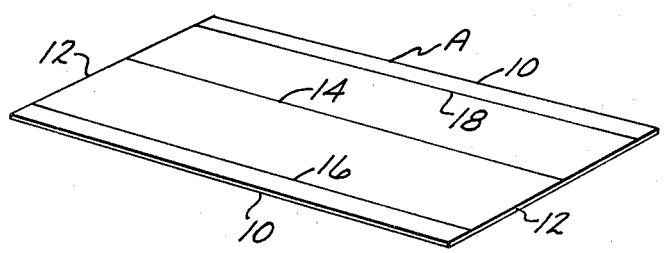
FIG. 1
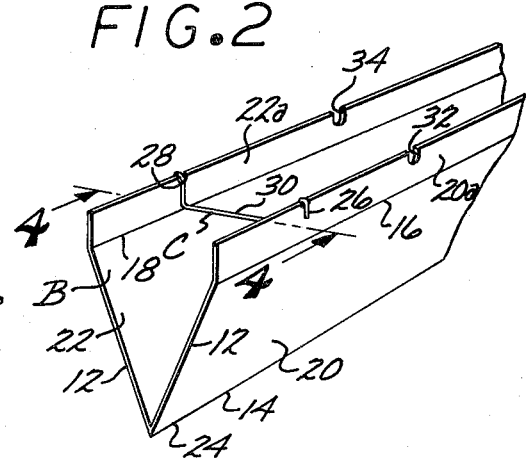
FIG. 2
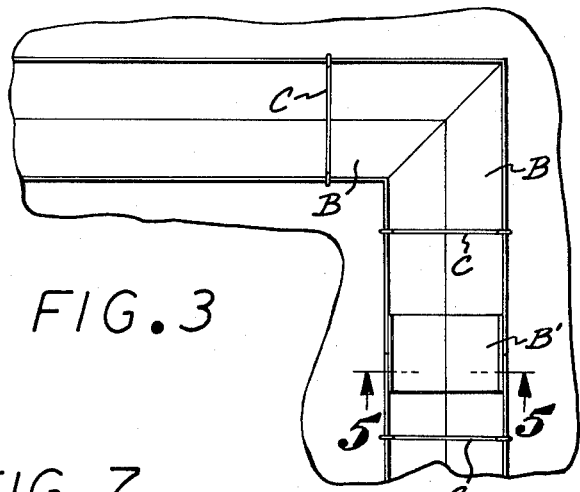
FIG. 3
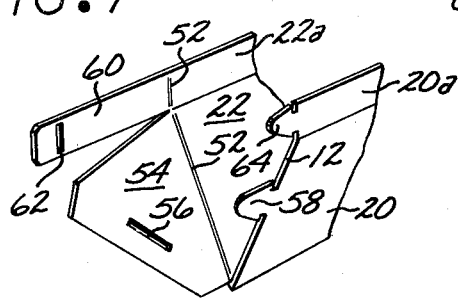
FIG. 7
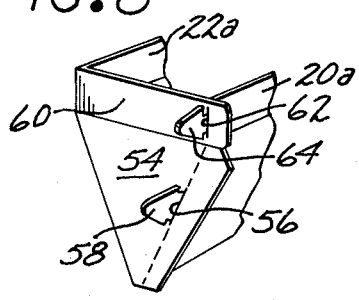
FIG. 8
FIG. 4
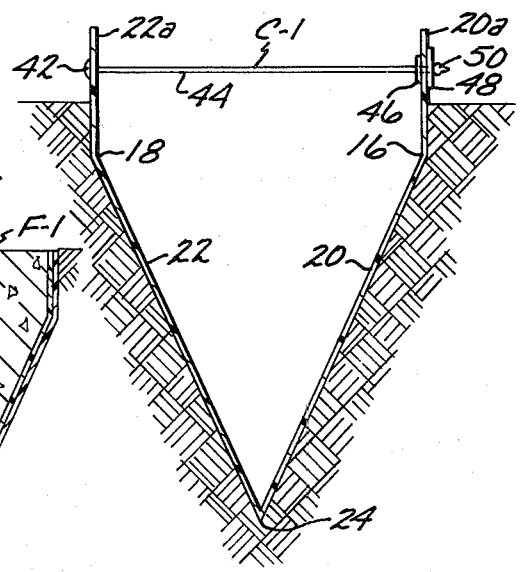
FIG. 6
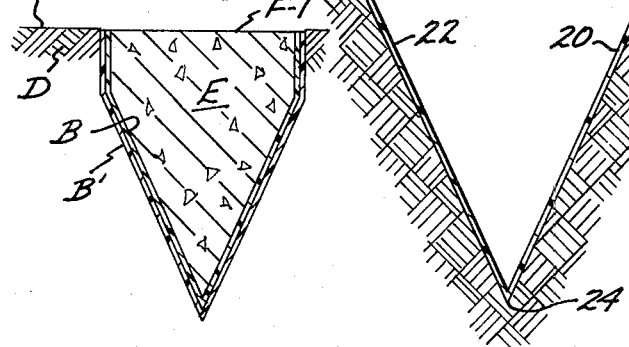
FIG. 5

GARDEN CURBING AND METHOD OF FORMING SAME

BACKGROUND OF THE INVENTION

1. Field of the Invention

The present invention relates to border structures and more particularly to concrete structures useful in defining garden edges.

2. Description of the Prior Art

Garden edges for containing growth of one variety from other varieties have been known in the past. Most frequently devices like wooden slats are utilized to limit the spread of growth. Such devices when installed are easily fractured by the weight of a person inadvertently stepping thereon. Alternatively either plastic or metal strips have been utilized to limit root growth resulting in exposed sharp edges which by virtue of their small size present a hazard to people walking proximate thereto. In each instance the effort is to sever the root growing path and thus limit the growth to the bounded area.

For the foregoing reasons and in order to provide more permanent separation of growth cement strips have been utilized in the past, such strips being formed by first forming the trough and then pouring wet cement on the trough interior. Since the latter technique entails extensive labor and expense, those engaged therein normally seek positive effectiveness and for that reason the prior art cement borders were typically cast in troughs eighteen to twenty-four inches deep in order to block most of the root propagation.

Thus as more permanent garden borders are desired one has to consider substantially larger investments in time and expense.

Accordingly techniques for reducing the cost of concrete borders are both desired and necessary for those engaged in landscaping.

SUMMARY OF THE INVENTION

Accordingly it is the general purpose and object of the present invention to provide an inexpensive technique for forming concrete borders around garden areas.

Other objects of the invention are to provide a method by which concrete borders may be formed with substantial ease.

Yet another object of the invention is to provide a structure which is inexpensively produced and which may be conveniently installed as a form into which fluid concrete may be placed to define a border that may either project above the ground surface or be flush therewith, with the latter structure being preferred as edging of a lawn is eliminated and a lawnmower may run over the border without danger of damaging the mower. Also, at least a portion of the strips are of such shape that such may be folded transversely to close the ends of the forms at the extremities of the border. The forms are of such configuration that the upper portions thereof may project above the ground surface to in effect define a curb, or the upper extremities of the forms may be flush with the ground surface. In the latter situation a concrete border is formed over which a lawn mower may be run without damage thereto, and one that eliminates edging.

Another object of the invention is to provide an easy and convenient method of forming a concrete border of sufficient depth that the roots of grass will not grow thereunder, and minimize the possibility of weeds growing in a garden area.

Briefly these and other objects are accomplished within the present invention by forming long rectangularly shaped strips of sheet material such as cardboard, paper mache, peat moss or the like, with each strip provided with a center scribe running longitudinally down the middle thereof, together with two equally spaced lateral scribes on either side of the center scribe. The scribes themselves are of sufficient depth to define folding lines about which the cardboard strip may be bent, it being intended to form a substantially V-shaped bend about the center scribe with the free ends of the "V" being convolved about the lateral scribes to form vertical walls and extensions thereof. It is further contemplated to provide fastening devices by which the vertical walls of the "V" are retained in position, it being intended to insert the V-shaped trough thus formed by its apex into the ground and to fill the trough with wet concrete.

BRIEF DESCRIPTION OF THE DRAWINGS

FIG. 1 is a perspective illustration of an exemplary cardboard strip useful with the invention herein;

FIG. 2 is yet another perspective illustration illustrating the cardboard strip convolved to form a V-shaped trough according to the invention herein;

FIG. 3 is a top view illustrating the alignment of two intersecting troughs formed according to the invention herein;

FIG. 4 is a sectional view of a trough partly buried in ground taken along line 4—4 of FIG. 2;

FIG. 5 is yet another sectional view of the trough taken along line 5—5 of FIG. 3 with the trough completely buried in the ground to provide a concrete border having a flat horizontal upper surface substantially flush with the ground surface;

FIG. 6 is yet another implementation of the means of securing the vertical walls of the trough according to the invention herein;

FIG. 7 is a perspective view of an end portion of the trough prior to the end portion being folded to provide a transverse end piece; and FIG. 8 is a perspective view of a trough end portion after being folded to define a transverse end piece.

DESCRIPTION OF THE PREFERRED EMBODIMENT

The blank A used in forming the present invention is a rectangular sheet of a foldable material such as cardboard, paper mache, peat moss or the like, which sheet has first and second side edges 10 and end edges 12. A centrally disposed, longitudinally extending fold line 14 is defined in the sheet A, as are first and second folding lines 16 and 18 that are laterally spaced from the line 14 and parallel thereto.

A blank A is transformed into a concrete receiving form B as shown in FIG. 2 when the sheet A is folded on the line 14, 16 and 18. When the sheet A is so folded the resulting form B includes first and second angularly disposed side walls 20 and 22 that develop on the upper portions thereof into first and second elongate rectangular extensions 20a and 22a as shown in FIG. 2.

The first and second side walls 20 and 22 intersect to define a longitudinally extending apex 24. The concrete receiving forms B are held in a substantially fixed three-dimensional configuration as shown in FIG. 2 by a number of transverse longitudinally spaced clips C, each of which clips includes first and second spaced hooks 26 and 28 that have a connector 30 extending therebetween. The clips C are preferably formed from wire or like inexpensive material. The first and second extensions 20a and 22a have longitudinally spaced pairs of transversely aligned first and second notches 32 and 34 formed therein as shown in FIG. 2, with each of the pair of notches being engaged by one of the first and second hooks 26 and 28. The notches 32 and 34 permit the hooks 26 and 28 to be disposed downwardly below the upper longitudinal edges of the extensions 20a and 22a so that the clips are concealed when the form B is filled with fluid concrete as shown in FIG. 4.

The form B may be used in defining either a concrete border F as shown in FIG. 4 that extends upwardly above the surface 38 of the ground D, or a border F-1 as shown in FIG. 5 that has the upper surface thereof substantially flush with the ground surface. The form of border F-1 as shown in FIG. 5 is preferred inasmuch as a lawn mower may be run across the upper surface thereof without damage to the mower, and the problem of edging being eliminated.

In the use of the invention A a trench is dug into the ground D such as the trench 36 shown in FIG. 4 that conforms generally to the external configuration of the form B. When the trench 36 is to be used to form a border F as shown in FIG. 4 it will be obvious that it need not be as deep as the trench that is utilized in forming a border F-1 as illustrated in FIG. 5. After a trench 36 has been dug, the concrete receiving form B is disposed therein, and fluid concrete then poured into the form B or B' until the concrete is flush with the upper extremities of the first and second extensions 20a and 22a. The concrete receiving forms B are laid in the trench end-to-end, and a connector B' is provided by cutting off a short section of one of the forms and placing it to over lap adjoining end portions of the forms B as illustrated in FIG. 3. When the direction of the forms B that are laid end-to-end changes, such as the ninety degree angle shown in FIG. 3, the adjoining end extremities of the forms may be cut at an angle to form the corner as shown in FIG. 3, or if desired a preformed corner piece may be provided against which the ends of the forms B abut, or engage in overlapping fashion, in the same manner as the connector B' overlaps adjoining end portions of forms B.

An alternate form of clip C-1 is shown in FIG. 6 that is extended through transversely aligned openings formed in the extensions 20a and 22a. Each of the clips C-1 includes a head 42, an elongate shank 44 and a pair of washers 46 and 48 that frictionally grip the shank 44 and are situated on opposite sides of the extension 20a. To assist in mounting the washers 46 and 48 on the shank, the shank may have a slightly enlarged free end portion 50 of tapered configuration. Both the clip C as illustrated in FIG. 4 and the alternate form of clip C-1 illustrated in FIG. 6 serve the same function of holding the concrete receiving forms B in a dimensionally stable position prior to the form being filled with fluid concrete E.

To prevent fluid concrete E flowing from the form B at the end of a sequence of these forms, the end form is preferably formed with a folding line 52 in the second side wall 22 thereof as shown in FIG. 7, and the folding line 52 having a flap 54 extending outwardly therefrom in which a first slot 56 is formed. The first side wall 20 has a tongue 58 extending outwardly therefrom which tongue is of a generally arrowhead shaped configuration and is adpated to extend through the slot 56 and interlock therewith to hold the flap 54 in a transverse position as shown in FIG. 8 to prevent flow of fluid concrete E from the form. The end portion of the extension 22a has an extension of the fold line 52 formed therein, and the fold line having a strap 60 extending outwardly therefrom in which a second slot 62 is formed, with the strap being held in a transverse position when it is folded for a second tongue 64 of arrowhead shaped cross section to removably engage the strap 60, and the tongues 56 and 62 cooperating with the flap and strap to to define an end piece that prevents flow of concrete from the outermost ends of the concrete receiving form B.

Although the invention has been described as being formed from sheet material by a bending operation, it will be apparent that the concrete receiving forms could be preformed by a molding operation or extruding operation from a suitable material such as a plastic or the like that has sufficient rigidity to remain in a substantially uniform three dimensional configuration. Such preformed concrete receiving forms would be used in the same manner as the forms above described, and would have the advantage that they could be nested together when being shipped and when stored in a retail outlet. The preformed concept of a concrete receiving form B is particularly useful where the configuration of the border is to be of a curved configuration such as circular, oval or the like.

The use and operation of the invention has been described previously in detail and need not be repeated.

What is claimed is:

1. A dimensionally stable assembly that may be disposed in a trench dug into the ground, said assembly serving as a form to receive fluid concrete and maintain said fluid concrete in a border defining configuration during the time said concrete sets, with said border being of a sufficient depth that roots of grass on one side of said border will grow thereunder to the opposite side of said border, said assembly including:
   a. a generally rectangular sheet of a substantially rigid material that includes first and second longitudinally extending, angularly disposed side walls that intersect at their lower portions to define an apex, and first and second substantially parallel side wall extensions that extend upwardly from said first and second side walls; and
   b. first rigid means that extend transversely between said first and second side wall extensions and are removably secured thereto in longitudinally spaced relationship to maintain said first and second side wall extensions in fixed transverse relationship during the period said fluid concrete is being poured into said assembly as well as during the period in which said fluid concrete is setting is said assembly.

2. An assembly as defined in claim 1 in which said first means is disposed below the upper extremities of said side wall extensions, with said first means being invisible after said assembly has been filled with fluid concrete.

3. An assembly as defined in claim 2 in which said side wall extensions has upper longitudinal edges that have a plurality of longitudinally spaced pairs of transversely aligned notches formed therein, and said first means being a plurality of clips that are transversely disposed and each clip removably engaging one of said pair of notches.

4. An assembly as defined in claim 3 in which each of said clips includes a pair of hooks that engages one of said pairs of notches, and a connector that extends between said hooks.

5. An assembly as defined in claim 4 in which each of said clips is a single piece of stiff wire that is bent to define said pair of hooks and said connector.

6. An assembly as defined in claim 2 in which said first and second side wall extensions have a plurality of longitudinally spaced pairs of first and second holes therein, said first and second holes in each of said pairs transversely aligned, and each of said first rigid means removably engaging one of said first and second holes.

7. An assembly as defined in claim 1 in which said sheet has first and second ends, and at least said first end of said sheet in said assembly including:
   c. a flap that extends outwardly from said first end of said second side wall;
   d. a strap that extends outwardly from said first end of said second side wall extension; and
   e. second means on said first ends of said first side wall and first side wall extension that engage said flap and strap to hold the latter in transverse positions on said assembly to close an end thereof.

8. An assembly as defined in claim 7 in which said second means are first and second tongues of arrowhead shape transverse cross section that project from said first ends of said first side wall and first side wall extension to engage first and second slots in said flap and strap when said flap and strap are transversely disposed.

* * * * *